United States Patent [19]

Hjertman et al.

[11] Patent Number: 4,592,743
[45] Date of Patent: Jun. 3, 1986

[54] APPARATUS FOR MIXING LIQUIDS

[75] Inventors: Birger T. Hjertman, Vällingby; Percy E. Bennwik, Saltsjö-Boo, both of Sweden

[73] Assignee: KabiVitrum AB, Stockholm, Sweden

[21] Appl. No.: 694,829

[22] PCT Filed: May 16, 1984

[86] PCT No.: PCT/SE84/00185
§ 371 Date: Jan. 10, 1985
§ 102(e) Date: Jan. 10, 1985

[87] PCT Pub. No.: WO84/04461
PCT Pub. Date: Nov. 22, 1984

[30] Foreign Application Priority Data

May 18, 1983 [SE] Sweden ............................ 8302796

[51] Int. Cl.⁴ .............................................. A61M 5/14
[52] U.S. Cl. .................................... 604/82; 604/89; 604/91; 604/92
[58] Field of Search ............................. 604/80–92

[56] References Cited

U.S. PATENT DOCUMENTS

| | | | |
|---|---|---|---|
| 3,746,216 | 7/1973 | Frederick | 604/82 |
| 4,258,723 | 3/1981 | McCùe et al. | 604/82 |
| 4,325,368 | 4/1982 | Kaemmerer | 604/82 |
| 4,396,383 | 8/1983 | Hart | 604/82 |

Primary Examiner—C. Fred Rosenbaum
Assistant Examiner—Christa K. Scott
Attorney, Agent, or Firm—Cushman, Darby & Cushman

[57] ABSTRACT

This invention relates to a device for dosing and mixing of two or more liquids. According to the invention, the liquids are led to a chamber (26) where they are mixed, an outlet (30) from the chamber being closed at the same time. When the chamber (26) has been filled, the outlet (30) is opened while the inlets (21, 22) for the starting liquids are simultaneously closed, and when the chamber (26) has been emptied, the outlet (30) is closed again and the inlet or inlets (21, 22) are opened. This cyclic process is repeated any desired number of times. The chamber has a variable volume, and changes of the volume are sensed by a sensor (28), which controls the opening and closing of the inlets and the outlets.

The device for carrying out the method is provided with a mechanical bistable flip-flop device, which in one of its stable positions opens the inlets (21, 22) and closes the outlet (30), and in the other stable position closes the inlets and opens the outlet. The shifting between the two stable positions is controlled by the sensor (28).

Alternatively, the flip-flop device may be arranged to open and close the inlets, while the outlet remains open, and to close the outlet only when the supply of liquids is essentially exhausted.

It has been found that the invention is especially suitable for use at infusion of a mixture of two or more liquids into a patient.

6 Claims, 17 Drawing Figures

APPARATUS FOR MIXING LIQUIDS

This invention relates to an apparatus for mixing liquds. The invention especially relates to a device for mixing and infusion of two or more liquids into a patient. However, the device of the invention can also be utilized for a safe infusion of one single liquid into a patient.

In medical treatments, it is often desirable to infuse two or more solutions at the same time into a patient. For example, in a total parenteral nutrition it is often desired to give a fat emulsion, amino acids and carbohydrates in mixture to get an infusion liquid which is as little unpleasant to the patient as possible but which still gives the patient a correctly composed nutrition and a sufficient amount of energy.

This problem has previously been solved in various manners. Three separate infusion aggregates have for instance been used which are connected with two three-way valves at the patient. However, as a consequence of this, three long hoses must be led up to the patient which can be complicated and uncomfortable. The main disadvantage of this method is that it is difficult to set a suitable infusion rate as three separate adjusting means and three separate drip chambers must be used.

Another way of solving the problem is to mix the various infusion liquids in advance in a mixing container having a sufficient volume for the intended infusion time, usually 2.5–3 l per 24 hours. However, there are difficulties here, as sterility must be maintained all the time during the handling of the various liquids. Mixing has mostly been carried out at another place than in the patient's immediate vicinity, and then usually in the dispensary of a hospital. Due to this, a certain storage time will often be necessary, especially during holidays. As the infusion solutions after mixing most often have a very limited shelf life, considerable problems are encountered. It also recommended for most factory-packed infusion liquids that the liquid must be consumed within a certain time after breaking the seal of the original package, usually 12 hours.

In all infusion therapy, there is a risk that air is supplied to the patient when the infusion bottle is emptied as the hose can then be filled alternately with air and liquid. This risk is reduced by having drip chambers of a certain liquid volume and by placing the hose in an arc lower than the patient. At infusion with several liquids at the same time, the risks will be substantially greater than air is led to the patient, as liquid from a filled bottle may suck air from an empty bottle.

There is another risk if a bottle falls to the floor during the infusion and is broken, or if the connection to the bottle comes loose unintentionally, in that a reverse flow arises such that the patient's blood flows out of the infusion aggregate and the patient bleeds to death.

The present invention provides a device for mixing two or more liquids, where the disadvantages mentioned above are largely eliminated and the risks of air embolism and back flow are reduced.

According to the invention, two or more liquids are dosed in such a way that the liquids used as starting materials are dosed from a supply container in definite amounts or amount ratios to a chamber until said chamber is filled, after which the supply of the starting liquids to the chamber is stopped and an outlet for the mixed liquids is opened at substantially the same time, and the liquid mixture is discharged, and that when substantially the whole amount of liquid mixture has been withdrawn, the outlet is closed substantially at the same time as the supply of the starting liquids is restarted. This process is thereafter repeated as many times as desired.

Opening and closing of the supply and outlet lines are preferably carried out by arranging the chamber with a variable volume and that changes of this volume are sensed by a sensor, which controls the opening and stopping of the supply of starting liquids and the discharge of liquid mixture. In a suitable embodiment, the chamber is provided with a movable wall, the position of which is adapted to the filling degree in the chamber and is sensed by the sensor. The movable wall and preferably the whole chamber is preferably made of a plastic sheet material.

In one form according to the invention, the liquid mixture will be discharged intermittently from the chamber with interruptions for the periods when the chamber is filled with the starting liquids. It is preferable, particularly in infusion of a liquid mixture into a patient, that these interruptions are as short as possible so that infusion can take place at an even rate. This can be achieved by dimensioning the supply of starting liquids relative to the discharge of liquid mixture such that the time of supply of starting liquids is short in comparison with the time for the discharge of the liquid mixture. When infusing a liquid mixture, the time of discharge of the mixture should be at least 10 times longer than the time of supply of starting liquids, and preferably 25–50 times longer. This means that the chamber is quickly filled with the starting liquids while the infusion rate is slow. The chamber can for instance be filled in about 10 seconds, while the infusion of a chamber volume takes about 6 minutes. In this way disturbances due to the intermittent discharge of liquid mixture will be negligible in practice.

Accordingly, the invention relates to a device for mixing of liquids and comprising (a) a supply container for each of the starting liquids to be mixed, and liquid lines from each of these containers;

(b) a chamber in which the liquid lines from the supply containers end, the chamber having a variable volume and variations of this volume being sensed by a sensor;

(c) an outlet line for a liquid mixture from the chamber;

(d) valve means for opening and interrupting a liquid flow in the inlet lines from the supply containers and in the outlet line from the chamber, and (e) connection means between the valve means in the supply lines for the starting liquids and the valve means in the outlet line for the liquid mixture which causes either the supply lines to be open and the outlet line to be closed, or the supply lines to be closed and the outlet line to be open, or which causes the supply lines to open or close while the outlet line is held open, and closes the supply lines when the supply of starting liquids is exhausted, the connection means being controlled to shift between its two states by the sensor for variations of the volume of the chamber.

The invention is characterized in that the connection means consists of a mechanical, bistable flip-flop device, which in one of its stable positions closes the supply lines and opens the outlet line, and in its other stable position opens the supply lines and closes the outlet line, or which in one of its stable positions closes the supply lines and in its other stable position opens the supply lines, while the outlet line remains open, and closes the outlet line when the supply of starting liquids is essentially exhausted, said flip-flop device being made to shift between its two stable positions by mechanical influence from said sensor.

The chamber is preferably provided with a movable wall, the position of which is adapted to the filling degree of the chamber and is sensed by the sensor, and the movable wall is preferably made of a flexible sheet material.

A simple way of providing the opening and interruption of the supply and discharge of liquids is to arrange the supply lines and the discharge line to and from the chamber as flexible hoses, whereby it is easy to interrupt the liquid flow through a hose by pinching the hose. When liquid is then to flow through the line, the pressure on the hose is simply released. In this way, the supply of starting liquids and the discharge of liquid mixture can also be easily adjusted by arranging constrictions in the form of adjustable or fixed clamping means or constrictions on the liquid lines. These constrictions can be chosen such that the starting liquids can be supplied to the chamber for a short time while the liquid mixture is discharged for a longer time, as described above. It is then also suitable that the containers for the starting liquids are arranged at a higher level than the chamber and that this chamber in its turn is arranged on a higher level than the final outlet from the discharge line so that the liquids can flow under the influence of gravity. At infusion of a liquid mixture, the final outlet from the outlet line will thus be the point where the mixture is infused into the patient.

The device of the invention does not require any supply of electric energy and is therefore also suitable for ambulant infusion treatment. A mechanical bistable flip-flop device has two stable positions. If the device is brought from one of its stable positions over an unstable equilibrium position, it will rapidly flip over to the other stable position, and a very slight force is required close to the equilibrium position to flip the device over to one or the other stable position. The shift is accomplished by means of a spring of a suitable force, and various embodiments thereof are known to one skilled in the art. Three embodiments will be described in detail below.

Various methods and devices for mixing and dosing liquids, especially for parenteral administration, are previously known. However, they differ fundamentally from the device of the invention and also have disadvantages in comparison with the invention.

Thus, U.S. Pat. Nos. 3,056,403 and 3,625,211 describe devices for parenteral infusion where infusion liquid from a supply container is first filled into an intermediate container and is led from this container to the patient. However, there is no question here that the intermediate container is automatically refilled when it has been emptied, but the renewed filling must be effected by manually shifting various valve means such as a three-way cock. Consequently, a continuous monitoring of the infusion procedure is required.

U.S. Pat. No. 4,121,584 describes an infusion device, where an intermediate container is arranged between the supply container and the line to the patient. The intermediate container is filled and emptied automatically by shifting an anchor between two positions, one for filling and one for emptying. The basic differences between this device and the device of the invention are however, that filling and emptying of the container are controlled by a timer and thus not by sensing the filling degree of the intermediate container, and further, as a consequence of the time control, the device is operated electrically, electrical energy thus being necessary.

U.S. Pat. No. 4,300,552 describes an infusion device, where the filling degree of an intermediate container is sensed and controls its emptying and filling. Also here the sensing is electrical, as well as the operation of the valve means for filling and emptying.

Furthermore, U.S. Pat. No. 3,211,336 shows an mechanism for controlling an intermediate discharge of a fluid. The fluid in this case is the contents of a pressurized container, such as an aerosol type container, and the mechanism for a cyclically operated discharge of the fluid is powered by the pressure of the contents of the container. Such a mechanism cannot be operated by the simple hydrostatic pressure of a liquid which itself is under atmospheric pressure. Also, the mechanism shown has no provisions for blending two or more fluids before they are discharged, and it cannot be easily adapted to such blending.

DE-A1-29 51 106 shows a device for mixing two liquids, especially for infusion, and provided with a mixing chamber with two inlets and one outlet. This chamber has a constant volume and is continuously connected to supply bottles for the infusion solution. Such an arrangement involves risks for air being mixed into the infusion liquid, especially if the contents of one supply bottle should run out before the other and, furthermore, a special arrangement of supply bottles is required which makes it impossible to exchange a bottle independently of the other.

SE-B 377 975 discloses a mechanical flip-flop device for controlling the flow of a fluid through a number of lines. This device is intended to be included in an electrical time-controlled system in an automatical analysis apparatus, and the object is said to be to obtain a rapid shift, which reduces the risk of mixing successive liquid portions in the lines. Thus, the system shown is not flow controlled.

The flip-flop device can be actuated in a simple way by a movable wall of the chamber and via the sensor. The valve means connected to the flip-flop device can simply consist of clamping means, such as jaws or pins, which pinch together the flexible hoses conducting the liquid or starting liquids to the chamber and the liquid mixture therefrom. By a suitable embodiment of the flip-flop device, its springing force can also be utilized as a pinching force on the hoses for liquids.

The invention is illustrated more closely by the accompanying drawing.

FIGS. 1–4 therein shows the function in principle of a mechanical flip-flop device, while

FIGS. 1-4 schematically show the function in principle of a flip-flop device that can be used in an apparatus according to the invention. The flip-flop device comprises a link 1 which is rotatably mounted around the fixed axis 2 at one of its ends 3. At its other end 4 the fixed link 1 is articulatedly connected to one end 6 of a movable link 7 via the axis 5. The other end 8 of the movable link 7 is articulatedly connected to one end 9 of a draw spring 10, such as a helical spring. At its other end 11, the spring is subjected to a tensile force, illustrated by the arrow, such that the spring is under tension. The point of attachment of the tensile force, i.e. the other end 11 of the spring, can be moved in a vertical direction.

Figure 1:
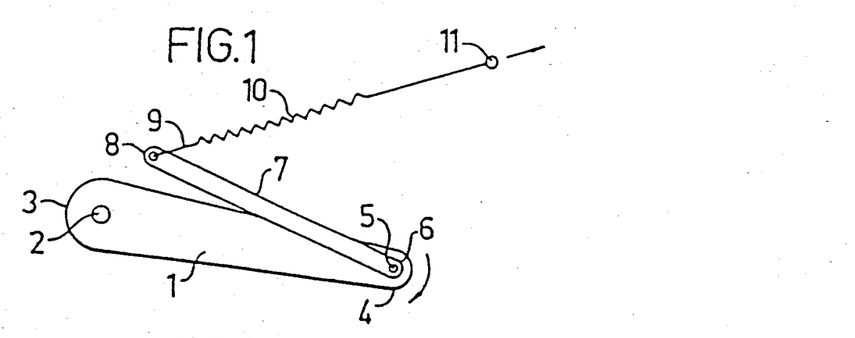

In the position shown in FIG. 1 the spring end 11 is in a higher position than the end 8 of the movable link and the end 4 of the fixed link. The tensile force of the spring will then tend to increase the angle between the movable link 7 and the spring 10 with the result that the end 4 of the fixed link is urged downwards around the fixed axis 2. By suitably arranged stops (not shown), the angle between the spring and the movable link is prevented from being too wide. The movable end of the fixed link can now be provided with means (not shown) shutting off the liquid flow in the supply line or lines for liquid or starting liquids or in the outlet line for liquid mixture, e.g. by pinching together one or more hoses for liquid.

Figure 2:
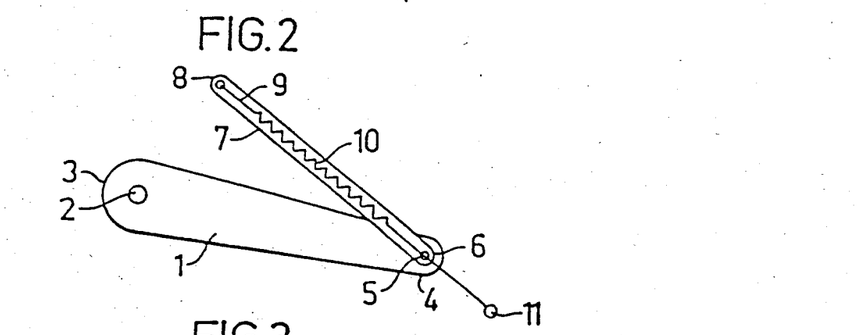

When the end 11 of the spring 11 is moved downwards, the angle between the spring and the movable link 7 will be reduced, but not the angle between the movable link 7 and the fixed link 1, until the spring and the link 7 in a certain position will be on the same straight line, as seen from the side, and the link 7 and the spring 10 are parallel, as shown in FIG. 2. It is realized that this position is an equilibrium position which, however, is extremely unstable as the least displacement of the spring end 11 downwards will make the movable link 7 flip over rapidly in the opposite direction and then bring along the movable end 4 of the fixed link 1.

Figure 3:
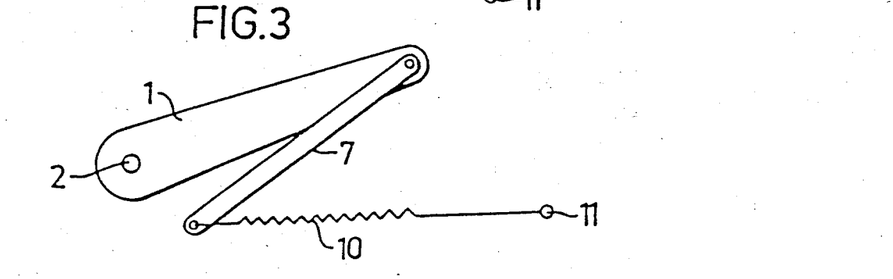
Figure 4:
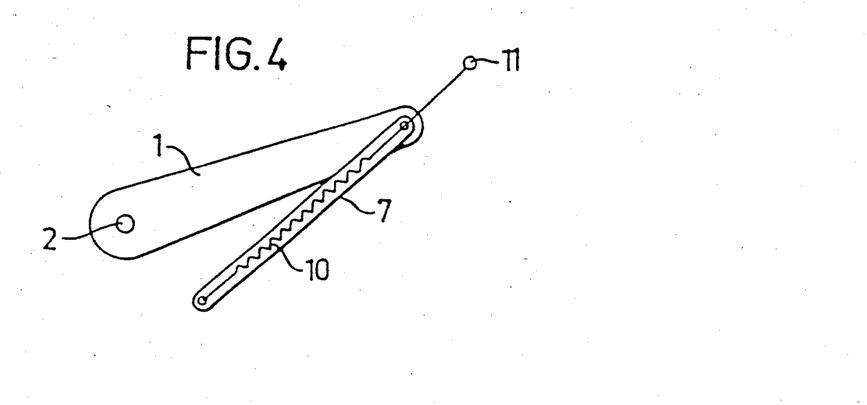

FIG. 3 shows how the spring end 11 has been moved further downwards. Also here the spring force will tend to increase the angle between the spring 10 and the movable link 7, the end 4 of the fixed link 1 being urged upwards. By suitable stops (not shown) the angle between the spring and the movable link is prevented from being too wide. In this position the fixed link can via suitable means (not shown) actuate the other of the outlet line for liquid or liquid mixture and the supply line or lines for liquid or outlet liquids and close it, such as by pinching together one or more hoses.

Thus, in practical use the spring end 11 can be connected to a sensor (not shown) sensing changes of volume of the chamber and consequently moving the spring end 11 upwards or downwards. When the chamber is filled with a liquid mixture the spring end 11 is in its upper position according to FIG. 1. The end 4 of the fixed link 1 is then pressed downwards by the movable link 7 and acts by a suitable means (not shown) to shut off the supply of starting liquids, e.g. by pinching the hoses for the starting liquids. On the other hand, the outlet line for liquid mixture is open.

As the chamber is emptied, its volume will be reduced, and this decrease moves the sensor such that the spring end 11 is moved downwards. When the spring and the links 1 and 7 are in the position shown in FIG. 2 the smallest additional movement of the spring end 11 downwards will make the movable link 7 flip over rapidly to a downward position according to FIG. 3, and its end 6 will then bring along the end 4 of the link 1 so that it is directed upwards. In this position the link 1 acts by suitable means (not shown) to close the outlet line for liquid mixture, e.g. by a hose being pinched together, while the supply lines for starting liquids are opened so that the liquid or starting liquids can be refilled into the chamber. At the filling, the volume of the chamber is increased and the spring end 11 is moved upwards via the sensor until it passes the equilibrium position according to FIG. 4 and then rapidly moves the links to the position shown in FIG. 1, the supply lines being closed again and the outlet line being opened. This cyclic process is repeated as long as liquid flows from one or more supply containers for starting liquids.

As the flip-flop device shifts rapidly between the two stable positions, the time during which the supply line or lines as well as the outlet line are opened will be negligibly short.

The outlet line is closed while the chamber is being filled, and therefore the chamber will be filled against a certain counterpressure. As a result of this, air cannot get into the chamber if one of the supply containers for starting liquids is emptied earlier than the others, but the chamber will be filled by the remaining liquids. When all the supply containers are emptied the supply will be interrupted with the outlet line in a closed position as there is no hydrostatic pressure left that can fill the chamber. Thus, there is never any risk that air will get into the outlet line, and this is of a vital importance when solutions are infused into patients.

Figure 5:
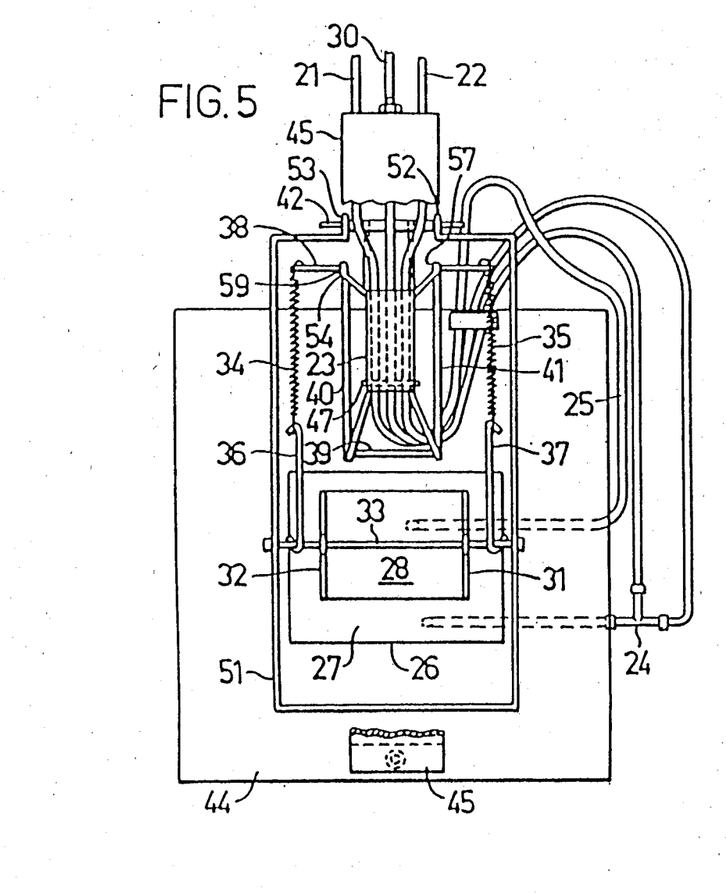
FIGS. 5 and 6 show the practical embodiment of a mixing device according to the invention.
Figure 6:
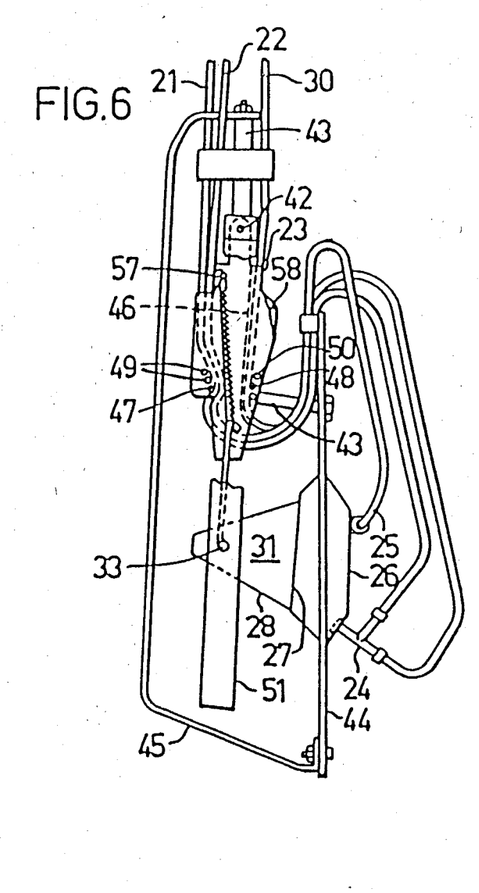
Figure 7:
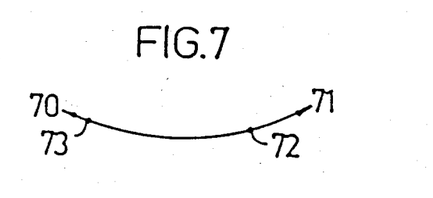
FIGS. 7–10 show the function in principle of another flip-flop device.

FIGS. 5 and 6 show a practical embodiment of a device according to the invention for mixing and dosing liquids. FIG. 5 is a front view of the device, and FIG. 6 is a side view of the device.

In the figures, the supply lines 21 and 22 for the starting liquids are shown, which are supplied from supply containers (not shown). The two supply lines are made as flexible hoses and pass through the valve means 23, which will be described in more detail in the following. The two lines are joined together by the T-shaped inlet pipe 24 and end in the chamber 26. This chamber is preferably made of a plastic sheet material and has a movable wall 27, which is connected to a sensor 28 for the position of the chamber wall. In this case, the sensor is made as a U-shaped member with a flat bottom, which is adhered to the movable chamber wall 27 and, thus follows it in its movements.

For discharge of the liquid mixture, the outlet pipe 25 connected with the outlet line 30 is used. This outlet line is also passed through the valve means 23 and is then led to a drip chamber of a conventional type (not shown) and further to an infusion needle when the device is used for infusion into a patient.

The U-shaped sensor 28 is via its legs 31 and 32 and the throughgoing axis 33 connected to the draw springs 34 and 35 via the connection members 36 and 37. The springs 34 and 35 are in their turn connected to the link member 38, which is shaped like a U with a flat bottom, where the bottom portion 39 serves as an axis through the valve portion 23, and the legs 40 och 41 fulfil the same function as the movable link 7 in FIGS. 1-4.

The valve portion 23 has the function shown by the link 1 in FIGS. 1-4. For this the valve portion 23 is rotatably connected to the support member 43 through the fixed axis 42, said support member being attached to the plate 44 supporting the chamber 26. In order to obtain a better stability of the device the support member 43 and the plate 44 are also connected over the arcuate support 45.

The supply lines 21 and 22 for the starting liquids and the outlet line 30 for the liquid mixture are passed through the valve means 23 on both sides of the support member 43, the supply lines 21 and 22 being arranged in front of the support member 43 and under the valve means 23, while the outlet line 30 is arranged behind the support member 43 and is drawn through a hole 46 therein. The valve means 23 is bent around the support member 43 so that it is mounted with the fixed axis 42 on both sides of the support member 43 and encloses the supply lines 21 and 22.

Two pins 47 and 48 are passed through the valve means 23, one pin 47 being placed on the front side of the support member 43 so that the supply lines 21 and 22 pass between the pin 47 and the support member 43. The other pin 48 is arranged through the valve means 23 behind the support member 43 så that the outlet line 30 for liquid mixture passes between the pin 48 and the support member 43. When the valve means 23 is turned around the axis 42, the pin 47 can either press against the supply lines 21 and 22 and close them while the outlet line 30 is not in contact with the pin 48, or the pin 48 can press against the outlet line 30 and close it, simultaneously as a free liquid passage is made possible through the supply lines 21 and 22 as the pin 47 does not press against them. As a plurality of holes 49 and 50 are made in the valve means the positions of the pins 47 and 48 can be varied to suit different dimensions of the liquid lines.

In order to give the device a better stability, the ends of the axis 33 can be connected with a yoke 51, the ends 52 and 53 of which are mounted on the fixed axis 42.

The function of the device is as follows:

When the chamber 26 is empty and is to be filled with starting liquids, the movable chamber wall 27 is in its innermost position and consequently also the sensor 28. Its two legs 31 and 32 have then moved the shaft 33 and the connection members 36 and 37 with the draw springs 34 and 35 inwards. In this way the valve means 23 has been moved outwards due to the snap effect of the flip-flop device, and the pin 48 will press the outlet line 30 against the back side of the support member 43 so that the outlet line is pinched together and the liquid flow through it is interrupted. However, the pin 47 will not press against the supply lines 21 and 22 when the valve means is in this position and the inflow of starting liquids is therefore unimpeded.

As the chamber 26 is filled with starting liquids, its movable wall 27 will be moved outwards and consequently also the sensor 28 with its legs 31 and 32. The connection members 36 and 37 with the draw springs 34 and 35 will then also be moved outwards until an unstable equilibrium position is reached, where the connection members 36 and 37, the springs 34 and 35 and the legs 40 and 41 are all parallel. The smallest additional movement outwards will now by the action of the flip-flop device make the legs 40 and 41 of the link member flip over in the other direction and in this way move the valve means 23 to its other stable position. In this position, the pin 48 does not any longer press against the outlet line, and therefore a free outflow of liquid mixture is possible from the chamber 26. On the other hand, the pin 47 will now press against the supply lines 21 and 22 so that a liquid flow through them is prevented. The springs 34 and 35 are dimensioned with a sufficient spring force in order that the pins 47 and 48 should press sufficiently strong against the lines to close the liquid flow completely.

When a liquid mixture now flows out of the chamber 26 the movable chamber wall will be moved inwards, and consequently also the valve means 23, so that the outlet is closed and the inlet is reopened and filling of the mixing chamber can take place again.

This cyclic process can then be repeated as long as there is liquid left in any one of the supply containers for starting liquids. The supply containers are arranged at a higher level than the chamber such that the starting liquids flow to the chamber under a certain gravitational pressure where, as previously indicated, a certain counterpressure must be overcome to fill the chamber. Therefore there will be no risk that air will get into the chamber when one or more or even all the supply containers are emptied, but in the supply lines there will always be a certain liquid column of a height exactly corresponding to the counterpressure required to fill the chamber.

In order to limit the movement of the legs 40 and 41 of the link member 38 the valve means 23 is at its upper end close to the fixed axis 42 provided with stop shoulders 54, 57, 58 and 59, on which the legs rest in the two stable positions of the flip-flop means.

As a material for the chamber and its connections one of the plastic materials is preferably selected that has been found to be suitable for use as disposable articles in medical care. The chamber with the connections is preferably of a disposable type and is discarded after use. Plastic materials meeting these demands are well-known to one skilled in the art. If the mixing and dosage device of the invention is not to be used for a medical purpose, the choice of material will of course be more free but also here one skilled in the art can easily select a material corresponding to the demands in each specific case.

At the infusion of a liquid mixture, using the device according to the invention, the flow of liquid mixture to the patient is mostly adjusted by means of a regulating device and a drip chamber. These devices and their use are wholly conventional and are therefore not further described here. The connections of the supply lines to the supply containers of the starting liquids are also of a conventional type with built-in airing. The constriction means on the supply side, however, can be the supply lines if these for example are thin hoses and diameters and/or length conditions are chosen such that the flow resistance in the hoses gives rise to a desired relation between the mass flow from the various supply containers. The above applies if the liquid of the supply containers is on the same horizontal level. Of course the mass flow can also be adjusted by maintaining the liquid of the supply containers at different levels.

A desired mixing ratio between the starting liquids can also be achieved by attaching constriction means over the inlet hoses. This device constricts the flow in the three hoses differently, and therefore a desired mixing ratio between the starting liquids is achieved in the chamber. As the constriction device is provided in various designs, the user can choose the constriction means giving him a desired mixing ratio.

When the device is to be used for infusion, it must first be checked that all the conduits and the chamber are completely filled with liquid so that no air can get into the patient. The infusion as such is thereafter carried out in a conventional manner well-known to one skilled in the art. As the time for filling the chamnber is short in comparison with the time for the discharge of the liquid mixture, the short breaks in the infusion will not cause any noticeable inconvenience to the patient.

Another way of providing a bistable flip-flop device according to the invention is shown in FIGS. 7-10. Here a planar spring is articulatedly clamped between the points 70 and 71 so that it forms an arc. At the point 72 the spring is actuated by the movable wall of the chamber. As the chamber is filled, the spring is deformed to an S-shape according to FIG. 8. When the center of the spring has passed an imaginary line between the points 70 och 71, the spring will momentaneously take the shape shown in FIG. 9. A point 73 has been selected such that it will be substantially stationary before the centre of the spring passes the imaginary line between the points 70 and 71, see FIG. 8, and then move momentaneously to the position shown in FIG. 9. By utilizing a leaf spring in this way, the point 73 can be made to actuate for example the valve function of the hoses and shift between two distinct positions when the point 72 with a relatively even motion is conveyed between its end positions.

Figure 11:
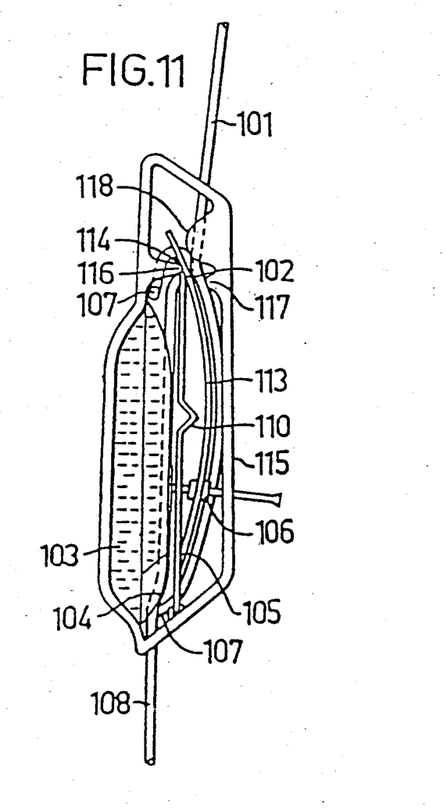
FIGS. 11 and 12 show a device according to the invention used as a safety device at the infusion of one single liquid.
Figure 12:
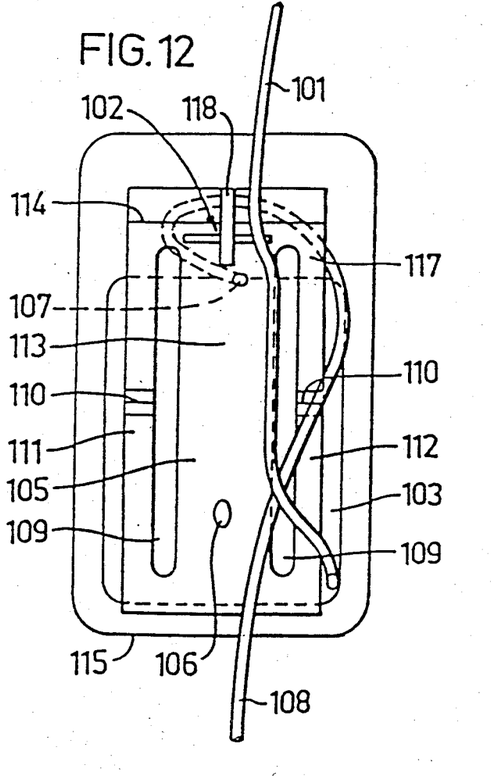

FIGS. 11 and 12 show a practical embodiment of a device according to the invention used as a safety means at the infusion of one single liquid.

FIG. 11 is a side view of the device and FIG. 12 is a front view thereof.

In the figures, the supply line 101 for infusion liquid is shown, said liquid being supplied from a supply container not shown. The supply line is made of a flexible hose and passes the valve means 102, which will be described in more detail in the following. The supply line ends in the chamber 103, which has a movable wall 104, which is connected to the leaf spring 105 at the point 106.

For discharging the liquid, the outlet pipe 107 is used which is connected to the outlet line 108 consisting of a flexible hose. This hose is also led through the valve means 102 and then goes to the patient via a drip chamber and suitable constricting and controlling means (not shown) of a conventional type. In order to obtain a safe function and a small number of components, the leaf spring 105 in this illustrative example is embodied as follows. Two parallel slits 109 have been made in a plate of a suitable material, such as spring steel of 0.25 mm thickness. At 110 creases have been made in the two outer legs 111 and 112 of the spring such that these will create an arcuate outward bending of the center part 113 of the spring, the function described in FIGS. 7-10 being obtained. Close to one end of the spring, it has been bent along a line 114 and is at its other end it is clamped in the housing 115. The crease in the spring at the line 114 rests on an edge 116 in the housing 115. On the opposite side of the housing 115, there are two projections 117 and 118 which are the fixed parts of the valve means 102. The supply line 101 passes the valve means 102 in such a way that it is placed between the spring 105 and the projection 117. The outlet line 108 passes the valve means 102 in such a way that it is placed between the spring 105 and the projection 118.

The function of the device is as follows:

When the chamber 103 is empty and is to be filled with liquid, the movable chamber wall 104 is in its innermost position and as the spring is connected to the chamber in the point 106, the center of the spring forms an arc against the chamber and pinches the outlet line 108 against the projection 118 so that the outlet line is closed. In this position the supply line 101 is not pressed against the projection 117 of the spring but allows inflow into the chamber.

Figure 8:
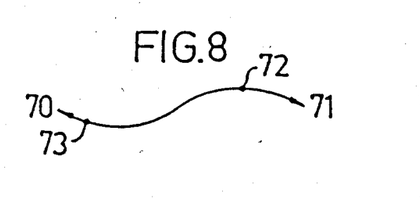
Figure 9:
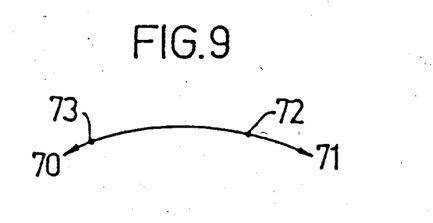
Figure 10:
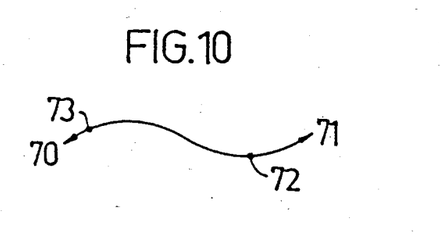

As the chamber 103 is filled with liquid, its movable wall 104 will be moved outwards and consequently also the point 106 on the central portion 113 of the spring such that it forms an S according to FIG. 8. As long as this S-shape remains, the outlet line is closed. When so much liquid has been supplied to the chamber that the spring changes its form momentaneously to an arc according to FIG. 9 from the chamber, the supply line 101 between the spring 105 and the projection 117 is pinched such that additional liquid supply to the chamber is prevented. The discharge line 108 is opened substantially at the same time so that the liquid now flows to the patient. As the chamber is now emptied, its movable wall 104 will be moved inwards and consequently also the point 106 on the center portion 113 of the spring such that it forms an S according to FIG. 10. As long as this S-shape remains, the supply line is closed. When so much liquid has been withdrawn from the chamber 103 that the spring momentaneously changes its form to an arc according to FIG. 7 against the chamber, the outlet line 108 is pinched between the spring 105 and the projection 118 such that additional withdrawal of liquid from the chamber is prevented. The supply line 101 is opened substantially at the same time so that liquid fills the chamber again. This cyclic process can then be repeated as long as there is liquid left in the supply container. The supply container is arranged at a higher level than the chamber so that a certain counterpressure of the liquid, created by the spring 105 and the movable wall 104 must be overcome. Therefore there is no risk of air getting into the chamber when there is no liquid left, but a certain liquid column of a height exactly corresponding to the counterpressure required to fill the chamber will remain in the supply line and the cyclic process stops with the outlet line closed. In case the supply container falls and breaks or the connection between the supply container and the supply hose comes loose during an infusion, the chamber is a good protection against reverse flow, such that the patient's blood does not flow out in a larger amount than the maximum capacity of the chamber, The above-mentioned situation can arise either during filling or emptying of the chamber. If this occurs during the filling of the chamber the outlet line 108 is closed and the liquid in the chamber can run out through the supply line 101, but the only result of this is that the outlet line 108 remains closed. If this happens during emptying of the chamber the supply line 101 is closed and blood from the patient can fill the chamber but cannot influence the position of the spring such that the supply line is opened.

Figure 15:
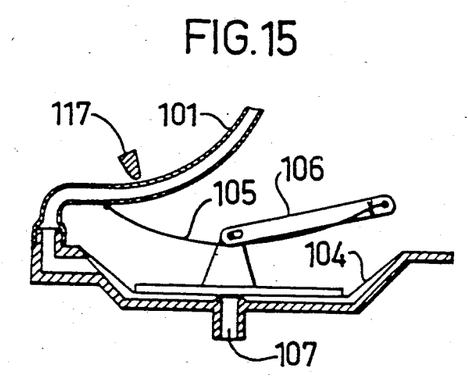
FIGS. 15, 16 and 17 schematically show a further practical embodiment of the invention, wherein a continuous outflow is arranged. In the drawing, like numbers designate like parts throughout all the figures.

FIG. 15 shows the apparatus before liquid has been supplied. The apparatus will be in the same position when the supply of liquid in the supply lines is exhausted.

Figure 16:
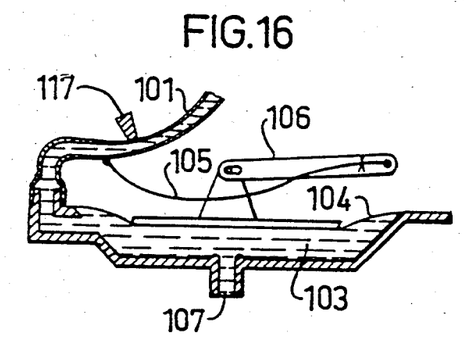

FIG. 16 shows the apparatus in filling position.

Figure 17:
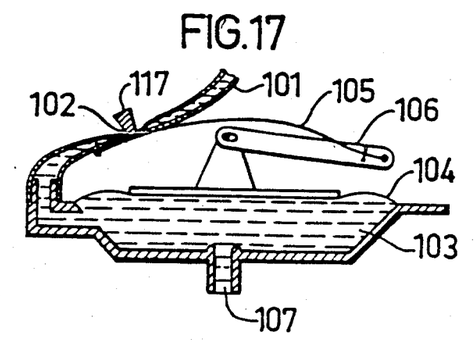

FIG. 17 shows the apparatus in a position when not being filled. In the figures are shown the supply line or, alternatively, the supply lines 101 for infusion liquid, which is supplied from a storage container not shown. The supply lines are made as flexible hoses and are led through the valve means 102 in such a way that they pass between the spring 105 and the projection 117. The supply lines end in the chamber 103, which has a movable wall 104 connected to leaf spring 105 via the link arm 106.

For discharge of the liquid is used the outlet conduit 107 which can be the drop-forming means in a giving set which leads the liquid further to the patient via a suitable restricting and adjusting device of a conventional type (not shown).

The function of the apparatus is as follows.

When the chamber 103 is empty and is to be filled (FIG. 15) with liquid, the movable chamber wall 104 is in its innermost position and seals against the outlet 107 so that this is closed. The leaf spring 105 lies in a bend towards the chamber as it is connected with the chamber via the link arm 106. In this position the supply line 101 is not pressed against the projecteion 117 by the spring, and a free flow through the hose to the chamber is possible.

As the chamber 103 is filled with liquid, its movable wall 104 will be moved outwards so that the outlet is opened and the liquid can be supplied to the patient. The outlet rate (infusion rate), however, is lower than the supply rate, and therefore the movable wall of the chamber will still be moved outwards and consequently also the link arm 106. This actuates the spring 105 so that it will form an S-shaped bow according to FIG. 16. As long as this S-shape remains the supply line is open. When a sufficient amount of liquid has been supplied to the chamber, the spring will quickly change its shape to an arc from the chamber according to FIG. 17, and the supply line 101 will be pinched between the spring 105 and the projection 117 such that further supply of liquid to the chamber is prevented. Liquid continues to flow from the outlet 107 to the patient. As the chamber is now emptied, its movable wall 104 will be displaced inwards and consequently also the link arm 106, which will actuate the spring 105 to shape it into an S contrary to that shown in FIG. 16. As long as this S-shape remains, the supply line is closed. When a sufficient amount of liquid has been emptied from the chamber 103 the spring quickly changes its shape to an arc against the chamber according to FIG. 15, and the supply line 101 is opened such that liquid will fill the chamber again. This momentary process takes place before the movable wall 104 reaches the outlet and seals it. This cyclic process can then be repeated as long as any liquid remains in the supply containers.

The link arm 106 is actuated by an additional spring (not shown) which presses the link arm against the movable wall 104. Due to this there will be a positive pressure in the chamber 104 and no air can reach the chamber as long as there is liquid left in any one of the supply containers. When the liquid supply has been exhausted in all the supply containers, the movable wall 104 will reach the outlet 107 and seal it.

It should be noted that the flip-flop devices described above are only examples. Mechanical, bistable flip-flop devices of other designs are known to those skilled in the art and can be utilized in a flip-flop device for use in accordance with the invention.

In the foregoing, the device of the invention has primarily been described starting from the fact that the flow in the outlet hose has been adjusted by constricting.

Figure 13:
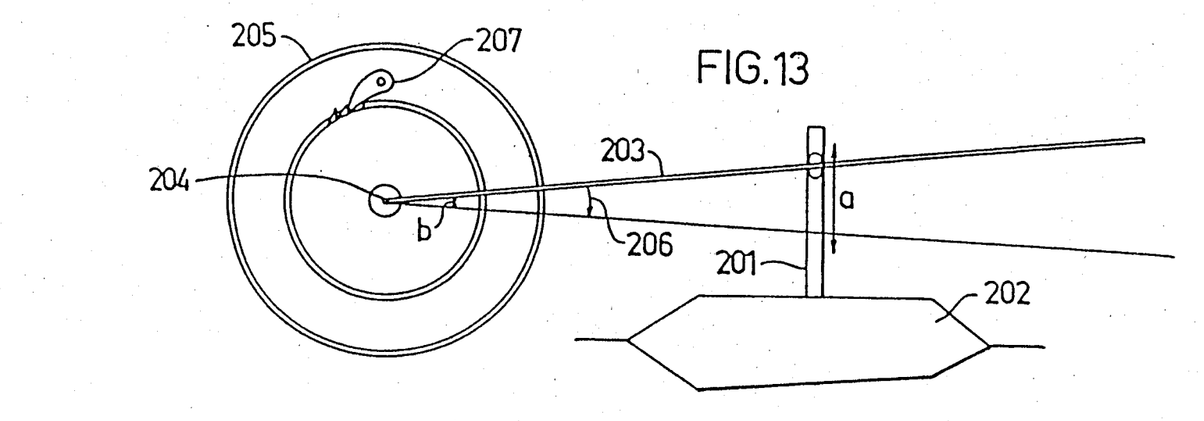
FIGS. 13 and 14 show another device of the invention provided with a special type of flow control.
Figure 14:
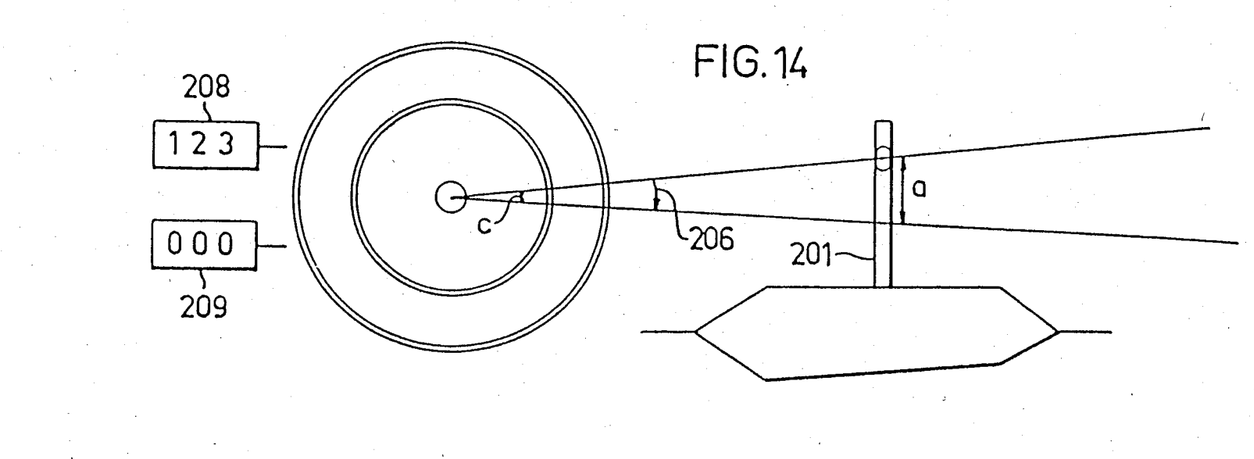

An embodiment where the flow control is carried out in another way and a dosage device and a volume measuring device are included is schematically shown in FIGS. 13 and 14 and is described in the following. In the figures, the chamber, the spring function and the valve mechamism are arranged according to one of the previously shown examples. The sensor 201 in FIG. 13 on the chamber 202 actuates in addition to the valve means (not shown in FIG. 13) a lever 203, one end 204 of which is attached to the center of a ratchet mechanism 205. It is the object of this mechanism to limit the angular velocity of the lever 203 in the direction of motion shown by the arrow 206 to a maximum velocity established in the manufacture. In the opposite direction of motion, the mechanism 205 is disengaged by means of the latch 207. The distance a indicates the distance which the sensor of the chamber moves when the chamber is filled and emptied, respectively. The volume of the chamber is known and the distance a of the movement of the sensor corresponds to this volume. By adjusting the velocity at which the sensor can cover the distance a, the supply velocity to the patient is therefore adjusted. The mechanism 205 is movably arranged relative to the sensor 201 of the chamber so that the length of the lever arm 203 is variable. At a certain length of the lever arm, the distance a will correspond to an angle b at the center of the mechanism 205. If the mechanism 205 is displaced towards the sensor 201, see FIG. 14, an angle c which is wider than b will correspond to the distance a. As the velocity at which the lever 203 can move in the directions indicated by the arrow 206 has an upper limit, an increase of the size of the angle from b to c will result in a longer time for the sensor to cover the distance a at a maximum angular velocity. Due to this, a displacement of the mechanism 205 relative to the sensor 201 results in a change of the maximal velocity of emptying of the chamber and consequently the supply velocity to the patient. The mechanism 205 is mechanically connected to two counters 208 and 209 such that they are operated by the mechanism. The counter 208 has the function to count backwards to zero from a manually set value when the sensor drives the mechanism 205 in the directions indicated by the arrow 206. When the counter 208 shows zero, the movement of the mechanism 205 is stopped and consequently also the movement of the lever 203 and the chamber, the infusion being stopped. The counter 209 has the function to show the total volume supplied to the patient. This counter is set manually to zero when desired.

It is to be noted that the driving force of all functions in this device for flow control, dosage and volume measurement is the hydrostatic pressure by which the infusion liquid actuates the movable wall of the chamber, and therefore it is necessary to place the supply containers at a higher level than the chamber and the patient at a lower level than the chamber. The height difference between the chamber and the patient must be so great that the maximum angular velocity of the lever 203 established in manufacture is achieved.

In a preferred embodiment, the mechanism 205 can consist of a balance-wheel or a centrifugal brake which is driven via gears of a suitable gear ratio. It is also possible to arrange the sensor as a rack and to transform the linear movement a to a rotary movement of a gear. During the emptying phase of the chamber, the velocity of this gear can be adjusted by the influence of an electronic device, such as a step motor, or a mechanical device, such as an adjustable frictional brake for speed control, and the counters can then be electronic or mechanical.

In the foregoing, the device of the invention has primarily been described with reference to use at an infusion of liquids into a patient. This is a suitable embodiment, but the invention is not limited merely to this use, but can be utilized in any specific case where it is intended to mix two or more liquids and to dose the mixture. One example of such a use is in column chromatography and other separation methods on columns for a long time. Several elution liquids can then be mixed and the mixture is dosed to the column for a long time, and at a suitable adjustment of the amounts, no additional monitoring of the system is required but replenishment of elution liquids as required. In this case it can also be a great advantage that the preferred embodiment of the device operates quite without any external energy supply, such as electricity. This is of a great importance when flammable solvents are handled.

The present invention provides a device for mixing, dosing and flow control of liquids which is safe, can be adjusted to a great precision and which does not require any external energy supply for its function.

We claim:

1. A device for dosing and mixing two or more liquids and comprising
    (a) a supply container for each of the starting liquids to be mixed, and liquid lines (21, 22) from each of these containers;
    (b) a chamber (26), in which the liquid lines (21, 22) from the supply containers end, the chamber having a variable volume and variations of this volume being sensed by a sensor (28);
    (c) an outlet line (30) for a liquid mixture from the chamber (26);
    (d) valve means (47, 48) for opening and interrupting a liquid flow in the inlet lines (21, 22) from the supply containers and in the outlet line (30) from the chamber (26); and
    (e) connection means (23) between the valve means (47) in the supply lines (21, 22) for the starting liquids and the valve means (48) in the outlet line (30) for the liquid mixture which causes either the supply (21, 22) to be open and the outlet line (30) to be closed, or the supply lines (21, 22) to be closed and the outlet line (30) to be open, or which causes the supply lines (101) to open and close while the outlet line (107) remains open, said connection means (23) being controlled to shift between its two states by the sensor (28) for variations of the volume of the chamber (26), characterized in that the connection means (23) consists of a mechanical, bistable flip-flop device, which in one of its stable positions closes the supply lines (21, 22) and opens the outlet line (30), and in its other stable position opens the supply lines (21, 22) and closes the outlet line (30), or which in one of its stable positions closes the supply lines (101) and in its other stable position opens the supply lines, (101) while the outlet line (107) remains open, and closes the outlet lines (107) when the supply of starting liquids is essentially exhausted, said flip-flop device being made to shift between its two stable positions by mechanical actuation from said sensor (28).

2. The device of claim 1, characterized in that the chamber (26) has a movable wall (27), the position of which is adapted to the filling degree of the chamber and is sensed by the sensor (28).

3. The device of claim 1, characterized in that at least the movable wall (27) of the chamber (26) is made of a flexible sheet material.

4. The device of claim 1, characterized in that the supply lines (21, 22) and the outlet line (30) are made of flexible hoses and the valve means (47, 48) consist of clamping means on the hoses.

5. The device of claim 1, characterized in that the supply containers are arranged at a higher level than the chamber (26) and that dosage of the liquid or starting liquids is carried out by means of stationary or adjustable constriction means arranged in the supply lines (21, 22).

6. The device of claim 1, characterized in that the dosage of the liquid mixture is accomplished by means of adjustable constriction means in the outlet line (3).

* * * * *